US012307694B2

(12) United States Patent
Ambrus et al.

(10) Patent No.: US 12,307,694 B2
(45) Date of Patent: May 20, 2025

(54) SELF-SUPERVISED MONOCULAR DEPTH ESTIMATION VIA RIGID-MOTION EMBEDDINGS

(71) Applicant: Toyota Research Institute, Inc., Los Altos, CA (US)

(72) Inventors: Rares A. Ambrus, San Francisco, CA (US); Sergey Zakharov, San Francisco, CA (US); Vitor Guizilini, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 436 days.

(21) Appl. No.: 17/715,844

(22) Filed: Apr. 7, 2022

(65) Prior Publication Data
US 2023/0326049 A1 Oct. 12, 2023

(51) Int. Cl.
*G06T 7/50* (2017.01)
*G06N 3/088* (2023.01)
*G06T 7/246* (2017.01)
*G06V 10/778* (2022.01)

(52) U.S. Cl.
CPC .............. *G06T 7/50* (2017.01); *G06N 3/088* (2013.01); *G06T 7/246* (2017.01); *G06V 10/778* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2020/0084427 | A1  | 3/2020 | Sun |
| 2021/0042937 | A1* | 2/2021 | Ji ............................ G06T 7/246 |
| 2021/0073997 | A1* | 3/2021 | Vora ....................... G06V 20/49 |
| 2021/0090277 | A1  | 3/2021 | Guizilini |
| 2021/0261158 | A1* | 8/2021 | Pazhayampallil .... B60W 30/09 |

(Continued)

FOREIGN PATENT DOCUMENTS

| CN | 108932725 A    | 12/2018 |
| CN | 112561979 A    | 3/2021  |
| DE | 102019208216 A1 | 12/2020 |

OTHER PUBLICATIONS

Vasiljevic et al., Neural Ray Surfaces for Self-Supervised Learning of Depth and Ego-motion, Aug. 2020, arXiv (Year: 2020).*

(Continued)

*Primary Examiner* — Chan S Park
*Assistant Examiner* — Promotto Tajrian Islam
(74) *Attorney, Agent, or Firm* — Christopher G. Darrow; Darrow Mustafa PC

(57) ABSTRACT

System, methods, and other embodiments described herein relate to training a depth model for monocular depth estimation using photometric loss masks derived from motion estimates of dynamic objects. In one embodiment, a method includes generating depth maps from images of an environment. The method includes determining motion of points within the depth maps. The method includes associating the points between the depth maps to identify an object according to a correlation of the motion for a first cluster of the points with a second cluster of the points. The method includes providing the depth maps and the object as an electronic output.

20 Claims, 8 Drawing Sheets

(56) References Cited

U.S. PATENT DOCUMENTS

| | | | | |
|---|---|---|---|---|
| 2021/0261159 | A1* | 8/2021 | Pazhayampallil | B60W 10/18 |
| 2021/0319578 | A1* | 10/2021 | Casser | G06T 7/248 |
| 2023/0023126 | A1* | 1/2023 | Ansari | G06T 7/55 |
| 2023/0260136 | A1* | 8/2023 | Joergensen | G01S 17/931 |
| | | | | 382/103 |
| 2023/0343108 | A1* | 10/2023 | Hemantharaja | G06V 10/82 |

OTHER PUBLICATIONS

Bian et al., "Unsupervised Scale-consistent Depth and Ego-motion Learning from Monocular Video", Oct. 3, 2019, https://doi.org/10.48550/arXiv.1908.10553 (Year: 2019).*

Casser, V. et al., "Depth Prediction Without the Sensors: Leveraging Structure for Unsupervised Learning from Monocular Videos", Association for the Advancement of Artificial Intelligence, Retrieved from https://arxiv.org/pdf/1811.06152.pdf, Nov. 15, 2018, in 8 pages.

Beker. D. et al., "Monocular Differentiable Rendering for Self-Supervised 3D Object Detection", Computer Vision—ECCV 2020, Retrieved from https://arxiv.org/abs/2009/14524, Sep. 30, 2020, in 20 pages.

Teed, Z. et al., "Raft-3D: Scene Flow using Rigid-Motion Embeddings", Retrieved from https://arxiv.org/pdf/2012.00726.pdf, Apr. 6, 2021, in 12 pages.

* cited by examiner

SELF-SUPERVISED MONOCULAR DEPTH ESTIMATION VIA RIGID-MOTION EMBEDDINGS

TECHNICAL FIELD

The subject matter described herein relates, in general, to systems and methods for determine depths of a scene from a monocular image, and, more particularly, to learning rigid motion embeddings that provide for estimating dynamic objects without additional object-level supervision.

BACKGROUND

Various devices that operate autonomously or that provide information about a surrounding environment use sensors that facilitate perceiving obstacles and additional aspects of the surrounding environment. For example, a robotic device may use information from the sensors to develop an awareness of the surrounding environment in order to navigate through the environment. In particular, the robotic device uses the perceived information to determine a 3-D structure of the environment in order to identify navigable regions and avoid potential hazards.

The ability to perceive distances through estimation of depth using sensor data provides the robotic device with the ability to plan movements through the environment and generally improve situational awareness about the environment. However, depending on the available onboard sensors, the robotic device may acquire a limited perspective of the environment, and, thus, encounter difficulties in distinguishing aspects of the environment.

For example, while monocular cameras can be a cost-effective approach to acquiring information about the surroundings, the sensor data from such cameras does not explicitly include depth information. Instead, processing routines derive depth information from the monocular images. However, leveraging monocular images to perceive depth can suffer from various difficulties. One known difficulty involves dynamic objects in a scene with different motion than the camera that collects the video. In such a case, because the difference in motion is not explicitly tracked and the separate objects are not identified, aberrations in depth result in the areas of movement leading to inaccuracies in training. Various approaches may integrate further detectors (i.e., object detectors) in order to avoid this difficulty; however, this adds further complexity with additional training requirements, which is undesirable. As such, many difficulties associated with determining depth data persist that may result in reduced situational awareness for a device, and, thus, difficulties in navigating or performing other functions.

SUMMARY

In one embodiment, example systems, and methods relate to an improved approach to training a depth model to derive depth estimates from monocular images. As noted previously, the presence of dynamic objects within a scene can cause difficulties training a depth pipeline on predicting depth using images that include the dynamic objects. Accordingly, in at least one approach, a depth system is disclosed that implements a novel network architecture to overcome difficulties with dynamic objects without the use of additional object-level supervision. That is, the present approach maintains benefits of self-supervision while also overcoming the difficulties associated with dynamic objects.

In one instance, the depth system implements a depth pipeline for self-supervised monocular depth estimation. Thus, the depth pipeline includes a pose model and a depth model, but also includes a motion model. The particular implementation of the motion model may vary but generally includes predicting rigid-motion embeddings without explicit supervision for training.

The motion model functions to estimate pixelwise motion through the use of per-pixel vectors. In one arrangement, the motion model iteratively updates a dense field of per-pixel Special Euclidean group three (SE3) motion embeddings. The rigid-motion embeddings provide an indicator of motion within a scene. Accordingly, the depth pipeline further provides depth maps as inferred depths associated with the images, and camera poses for a camera that generates the images, thereby approximating ego-motion. The depth system can then analyze the rigid-motion embeddings of points via the motion model to correlate clusters of points having similar motion, thereby identifying dynamic objects via the associations. As such, the depth system then learns a way to identify objects without explicit supervision of this process (e.g., without prior annotations) and simply through the use of existing ground truth information from the images.

In regards to improvements of self-supervised training, the depth system can leverage the identified dynamic objects to form masks within the images. That is, in order to improve the training and better account for dynamic objects in the images, the depth system generates masks for the dynamic objects to effectively remove the dynamic objects from consideration in a loss calculation. In one arrangement, the depth system generates photometric loss masks for the objects and computes a photometric loss on information within the image other than the dynamic objects but utilizing the masks to block out the dynamic objects. In this way, the depth system resolves difficulties with dynamic objects within images for self-supervised monocular depth estimation, thereby improving the training process and the accuracy of the depth model while also providing additional functionality in the performance of object detection without additional supervision.

In one embodiment, a depth system is disclosed. The depth system includes one or more processors and a memory communicably coupled to the one or more processors. The memory stores instructions that, when executed by the one or more processors, cause the one or more processors to generate depth maps from images of an environment. The instructions include instructions to determine motion of points within the depth maps. The instructions include instructions to associate the points between the depth maps to identify an object according to a correlation of the motion for a first cluster of the points with a second cluster of the points. The instructions include instructions to provide the depth maps and the object as an electronic output.

In one embodiment, a non-transitory computer-readable medium including instructions that when executed by one or more processors cause the one or more processors to perform various functions is disclosed. The instructions include instructions to determine motion of points within the depth maps. The instructions include instructions to associate the points between the depth maps to identify an object according to a correlation of the motion for a first cluster of the points with a second cluster of the points. The instructions include instructions to provide the depth maps and the object as an electronic output.

In one embodiment, a method is disclosed. In one embodiment, the method includes generating depth maps from images of an environment. The method includes determining motion of points within the depth maps. The method includes associating the points between the depth maps to identify an object according to a correlation of the motion for a first cluster of the points with a second cluster of the points. The method includes providing the depth maps and the object as an electronic output.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed associated with an improved approach to training a depth model to derive depth estimates from monocular images. As noted previously, the presence of dynamic objects within a scene can cause difficulties training a depth pipeline using images that include the dynamic objects. In general, this difficulty arises from the difference with the derived ego-motion of the camera and learned features of the environment relative to the ego-motion. Accordingly, in at least one approach, a depth system is disclosed that implements a novel network architecture to overcome difficulties with dynamic objects without the use of additional object-level supervision. That is, the present approach maintains benefits of self-supervision while also overcoming the difficulties associated with dynamic objects.

Therefore, in one embodiment, a depth system implements a depth pipeline for self-supervised monocular depth estimation that further includes a motion model to account for the dynamic objects. For example, the motion model may vary in form but generally functions to predict rigid-motion embeddings without explicit supervision for training. That is, in one arrangement, the motion model functions to estimate pixelwise motion through the use of per-pixel vectors. In one arrangement, the motion model iteratively updates a dense field of per-pixel Special Euclidean group three (SE3) motion embeddings for successive images processed through the depth pipeline. The rigid-motion embeddings provide an indicator of motion within a scene.

Consequently, the depth system can then analyze the rigid-motion embeddings of points, via the motion model, to correlate clusters of points having similar motion, thereby identifying dynamic objects via the associations of relative motion. As such, the depth system then learns a way to identify objects without explicit supervision of this process (e.g., without prior annotations) and simply through the use of existing ground truth information from the images.

In regards to training, the depth system can leverage the identified objects to form masks within the images. That is, in order to improve the training and better account for dynamic objects in the images, the depth system generates masks for the dynamic objects to effectively remove the dynamic objects from consideration in a loss calculation. In one arrangement, the depth system generates photometric loss masks for the objects and computes a photometric loss on information within the image other than the dynamic objects. In this way, the depth system resolves difficulties with dynamic objects within images for self-supervised monocular depth estimation, thereby improving the training process and the accuracy of the depth model while also providing additional functionality in the performance of object detection without additional supervision.

Figure 1:
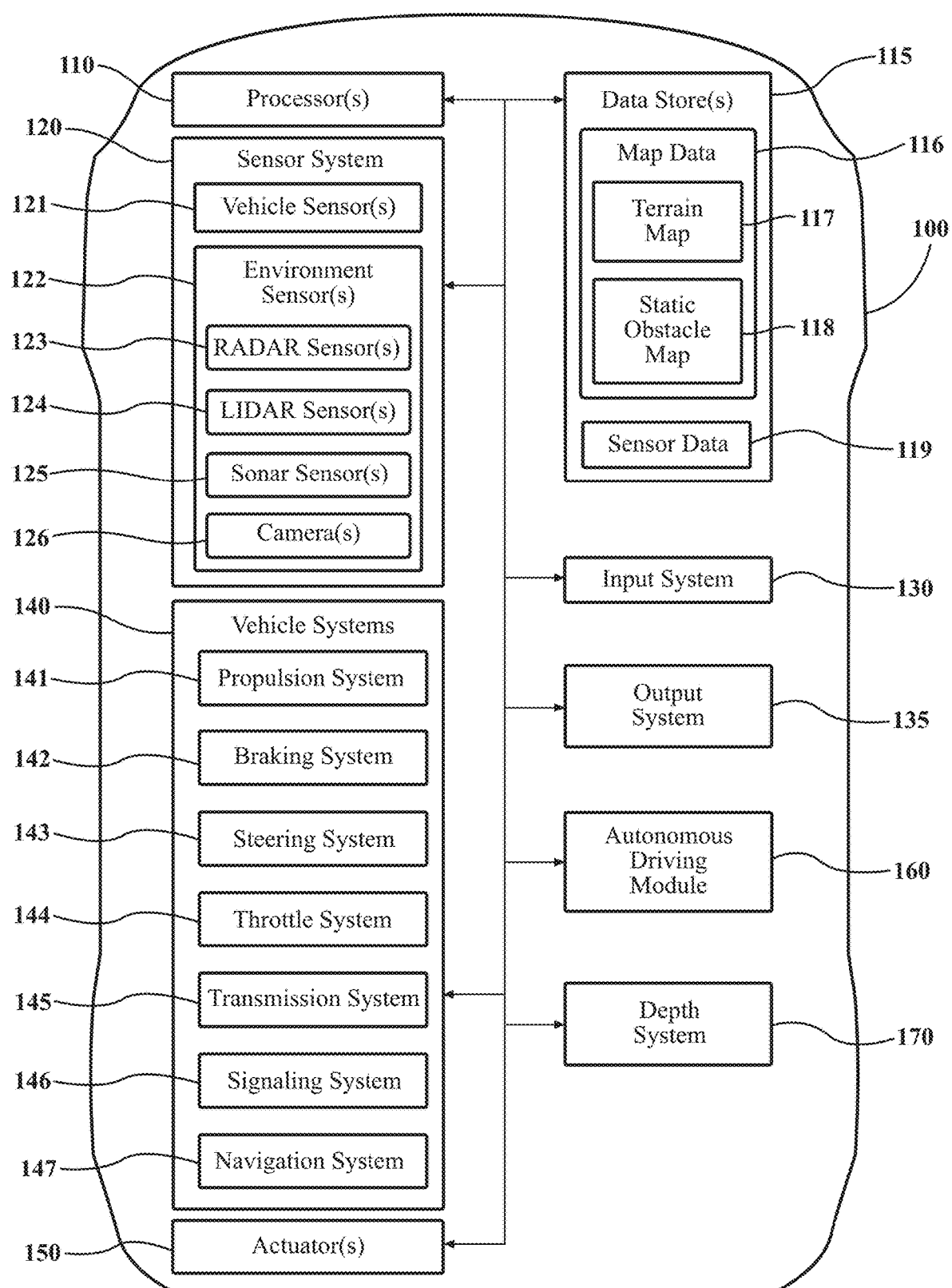
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device (e.g., smartphone, surveillance camera, robot, etc.) that, for example, perceives an environment according to monocular images, and thus benefits from the functionality discussed herein. In yet further embodiments, the vehicle 100 may instead be a statically mounted device, an embedded device, or another device that uses monocular images to derive depth information about a scene or that separately trains the depth model for deployment in such a device.

In any case, the vehicle 100 (or another electronic device) also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to train and implement a model to process monocular images and provide depth estimates for an environment (e.g., objects, surfaces, etc.) depicted therein. Moreover, while depicted as a standalone component, in one or more embodiments, the depth system 170 is integrated with the autonomous driving module 160, the camera 126, or another component of the vehicle 100. The noted functions and methods will become more apparent with a further discussion of the figures.

Figure 2:
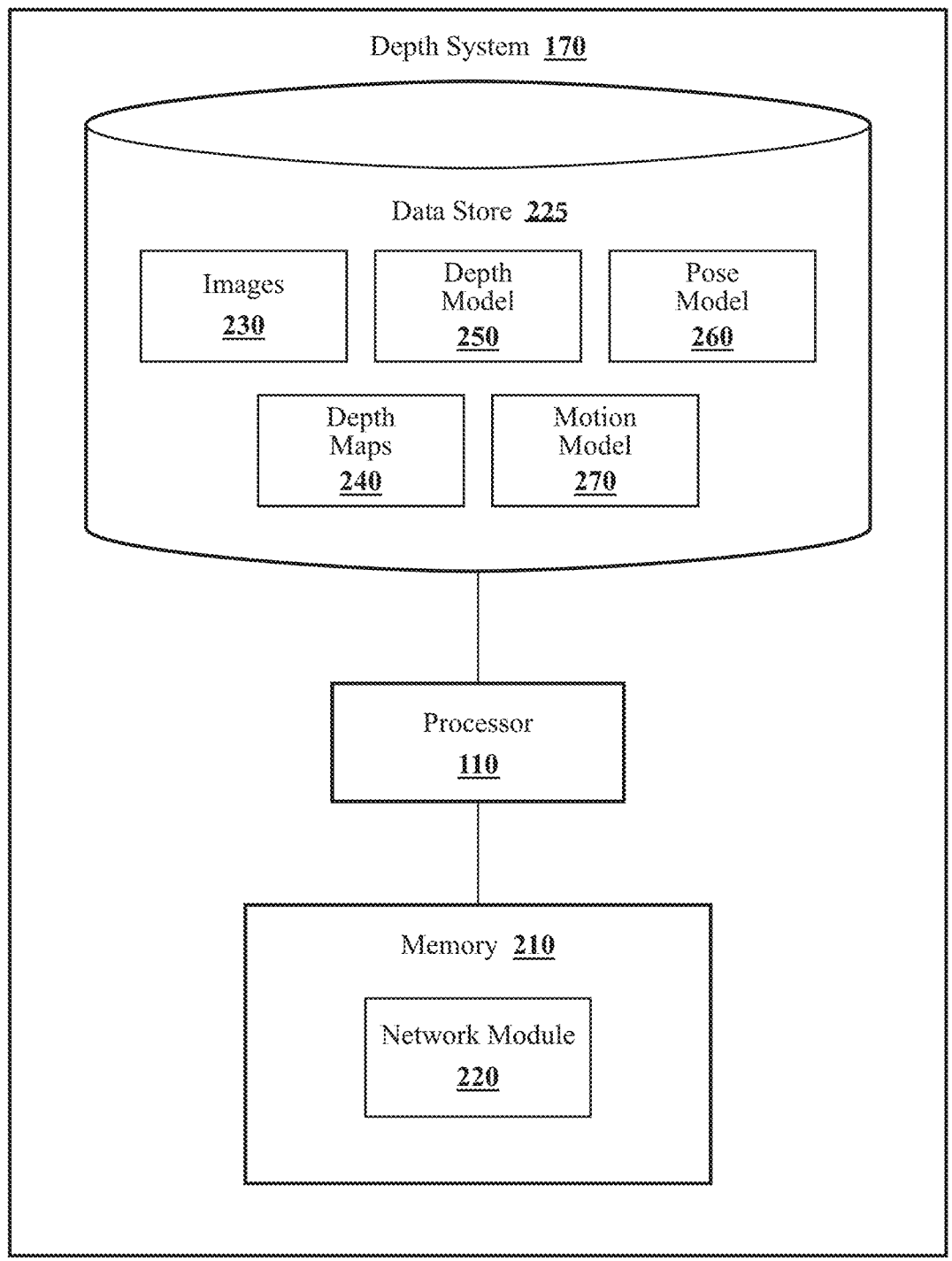
FIG. 2 illustrates one embodiment of a depth system that is associated with training a depth model.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor such as a microprocessor that is capable of performing various functions as described herein. In one embodiment, the depth system 170 includes a memory 210 that stores the network module 220 and the network module 220. The memory 210 is a random-access memory (RAM), read-only memory (ROM), a hard disk drive, a flash memory, or other suitable memory for storing the module 220. The module 220 is, for example, computer-readable instructions that when executed by the processor 110 cause the processor 110 to perform the various functions disclosed herein.

Furthermore, in one embodiment, the depth system 170 includes a data store 225. The data store 225 is, in one embodiment, an electronic data structure, such as a database, that is stored in the memory 210 or another memory and that is configured with routines that can be executed by the processor 110 for analyzing stored data, providing stored data, organizing stored data, and so on. Thus, in one embodiment, the data store 225 stores data used by the module 220 in executing various functions. In one embodiment, the data store 225 includes images 230, depth maps 240, a depth model 250, a pose model 260, and motion model 270 along with, for example, other information that is used by the network module 220.

Training data used by the depth system 170 generally includes one or more monocular videos that are comprised of a plurality of frames in the form of images 230 that are monocular images. As described herein, a monocular image is, for example, an image from the camera 126 that is part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126.

In any case, the monocular image itself includes visual data of the FOV that is encoded according to a video standard (e.g., codec) associated with the camera 126. In general, characteristics of the camera 126 and the video standard define a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the images 230 are monocular images in that there is no explicit additional modality indicating depth nor an explicit corresponding image from another camera from which the depth can be derived (i.e., no stereo camera pair). In contrast to a stereo image that may integrate left and right images from separate cameras mounted to generate an overlapping FOV to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the depth model 250 derives the depth maps 240.

Moreover, the monocular video may include observations of many different scenes, including various dynamic objects (i.e., objects in motion). That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training pairs of monocular images from the monocular video for training. In particular, the depth system 170 generates the pairs from the video so that the pairs of images are of the same scene. As should be appreciated, the video includes a series of monocular images that are taken in succession according to a configuration of the camera. Thus, the camera may generate the images 230 (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the pairs from successive ones (i.e., adjacent) of the frames from the video, but instead can generally pair separate images of the same scene that are not successive as training images. Thus, in one approach, the depth system 170 pairs every other image depending on the fps. In a further approach, the depth system pairs every fifth image as a training pair. The greater the timing difference in the video between the pairs, the more pronounced a difference in camera position; however, this may also result in fewer shared features/objects between the images. As such, as previously noted, the pairs of training images are of a same scene and are generally constrained, in one or more embodiments, to be within a defined number of frames (e.g., 5 or fewer) to ensure correspondence of an observed scene between the monocular training images. In any case, the pairs of training images generally have the attributes of being monocular images from a monocular video that are separated by some interval of time (e.g., 0.06 s) such that a perspective of the camera changes between the pair of training images as a result of motion of the camera through the environment while generating the video.

Moreover, while the images 230 are described as training images (i.e., for purposes of adapting the depth pipeline to improve accuracy/understanding), the depth system 170 similarly processes images of the same/similar character after training to generate the noted outputs (i.e., the depth maps 240). While the depth model 250 generates a single depth map per image, the pose model 260 and the motion model 270 accept inputs of multiple images (e.g., two or more) to produce outputs. Additionally, it should be noted that while the training data is generally characterized as including the images 230 alone, in various implementations, the depth system 170 may also use supplemental training data, such as sparse depth information (e.g., sparse LiDAR scans).

With further reference to FIG. 2, the depth system 170 further includes the depth model 250, which produces the depth maps 240, the pose model 260, which produces transformations of camera pose between the images 230, and the motion model 270, which produces the rigid-motion embeddings and object associations. The models 250, 260, and 270 are, in one embodiment, machine learning algorithms. However, the particular form of either model is generally distinct. That is, for example, the depth model 250 is a machine learning algorithm that accepts an electronic input in the form of a single monocular image and produces a depth map 240 as a result of processing the monocular image. The exact form of the depth model 250 may vary according to the implementation but is generally a convolutional encoder-decoder type of neural network.

Figure 3:
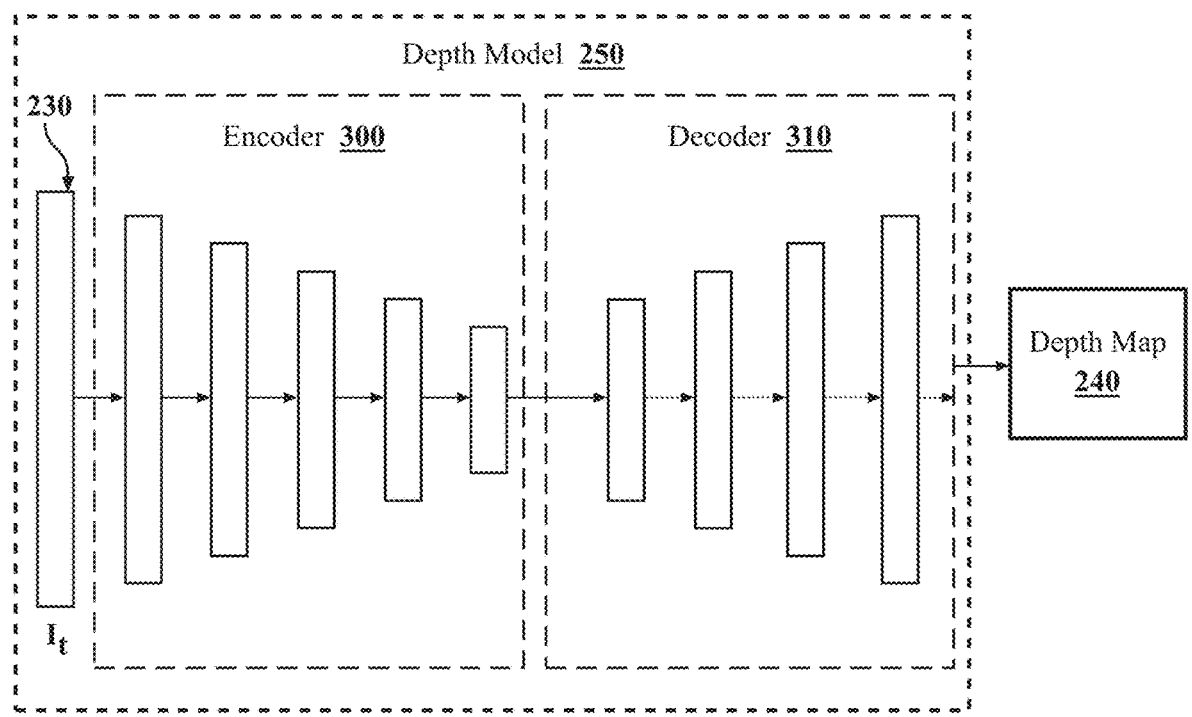
FIG. 3 illustrates one embodiment of a depth model that infers depth from a monocular image.
Figure 4:
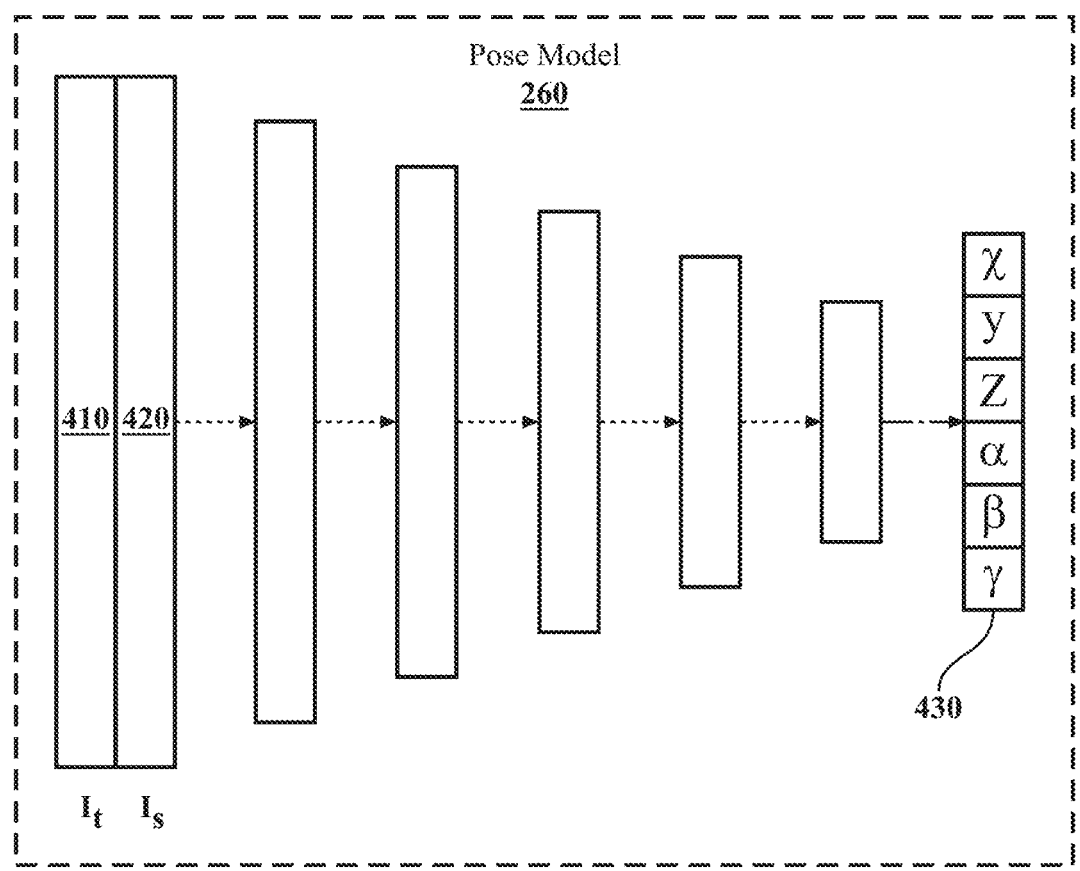
FIG. 4 illustrates one embodiment of a pose model that predicts rigid-transformations of a pose for a camera between images.
Figure 5:
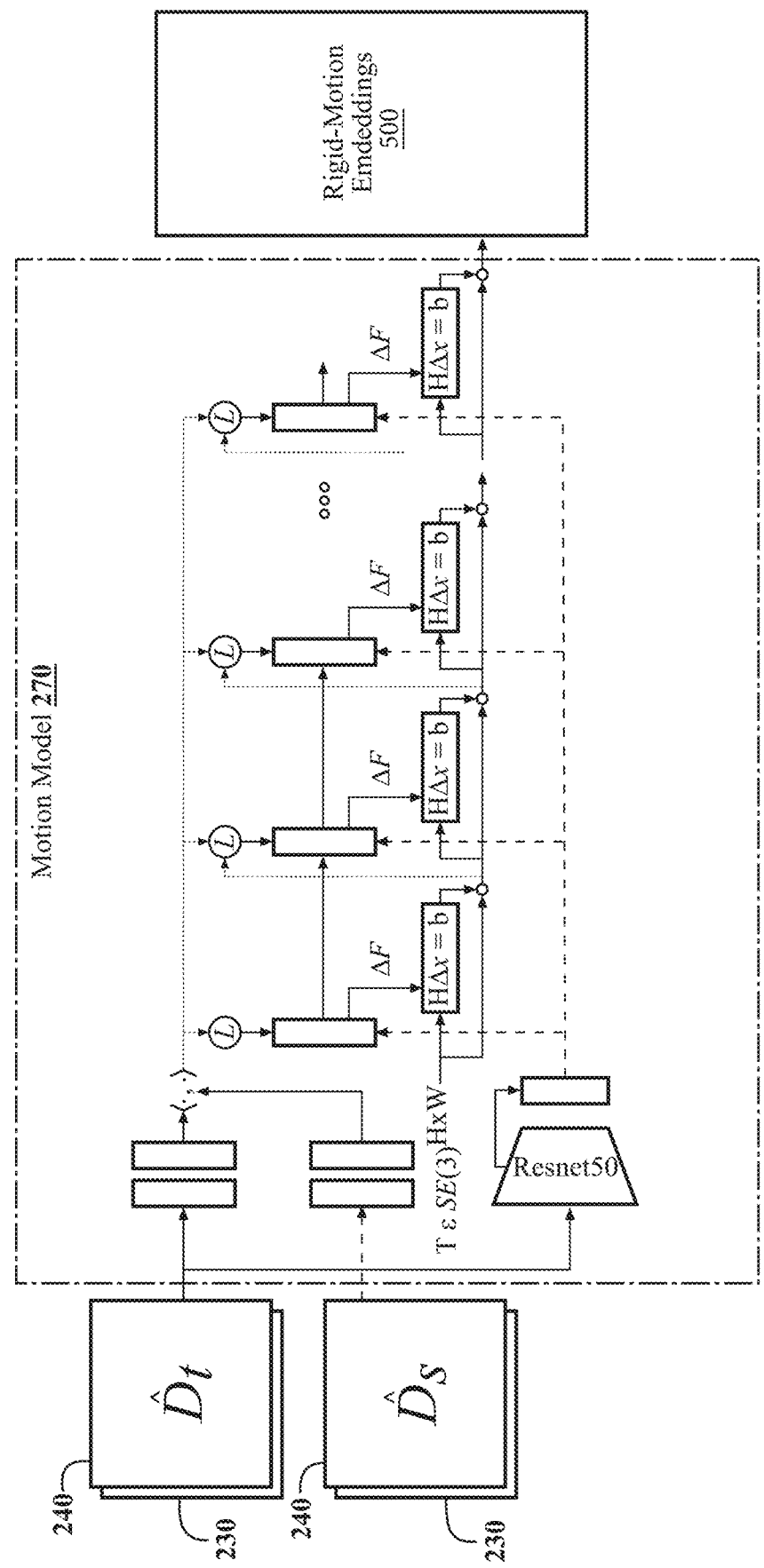
FIG. 5 illustrates one embodiment of a motion model that derives motion from images and depth data about a scene.

As an additional explanation of one embodiment of the depth model 250, the pose model 260, and the motion model 270, consider FIGS. 3-5. FIG. 3 illustrates a detailed view of the depth model 250 while FIGS. 4 and 5 illustrates the pose model 260 and the motion model 270, respectively. In one embodiment, the depth model 250 has an encoder/decoder architecture. The encoder/decoder architecture generally includes a set of neural network layers including convolutional components 300 (e.g., 2D and/or 3D convolutional layers forming an encoder) that flow into deconvolutional components 310 (e.g., 2D and/or 3D deconvolutional layers forming a decoder). In one approach, the encoder accepts one of the images 230 at a time as an electronic input and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 300 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 250. As such, the encoder includes a variety of separate layers that operate on the monocular image, and subsequently on derived/intermediate feature maps that convert the visual information of the monocular image into embedded state information in the form of encoded features of different channels.

In one embodiment, the decoder 310 unfolds (i.e., adapt dimensions of the tensor to extract the features) the previously encoded spatial information in order to derive the depth map 240 for a given image according to learned correlations associated with the encoded features. That is, the decoding layers generally function to up-sample, through sub-pixel convolutions and/or other mechanisms, the previously encoded features into the depth map 240, which may be provided at different resolutions. In one embodiment, the decoding layers comprise unpacking blocks, two-dimensional convolutional layers, and inverse depth layers that function as output layers for different scales of the feature map. The depth map 240 is, in one embodiment, a data structure corresponding to the input image that indicates distances/depths to objects/features represented therein. Additionally, in one embodiment, the depth map 240 is a tensor with separate data values indicating depths for corresponding locations in the image on a per-pixel basis.

Moreover, the depth model 250 can further include skip connections for providing residual information between the encoder 300 and the decoder 310 to facilitate memory of higher-level features between the separate components. While a particular encoder/decoder architecture is discussed, as previously noted, the depth model 250, in various approaches, may take different forms and generally functions to process the monocular images and provide depth maps that are per-pixel estimates about distances of objects/features depicted in the images.

Additionally, while not explicitly illustrated, the motion model 270 can be integrated along with the depth model 250 or can be a standalone neural network. That is, the depth model 250 and the motion model 270, in one approach, share a backbone, such as the encoder 300 while the decoder 310 is specific to the depth model 250 and the motion model 270 further includes additional components. In this arrangement, the motion model 270 receives encoded features from the images 230 instead of receiving the images themselves along with depth maps 240 generated by the depth model 250 for the images. Thus, the depth model 250 and the motion model 270 may share one or more components. Additionally, it should be appreciated that the depth model 250 operates on a single image at a time while the motion model 270 operates on multiple images/depth maps. Accordingly, the motion model 270 may buffer inputs from the depth model 250 prior to execution and thus does not generally operate in parallel with the depth model 250. Additional details of the motion model 270 will be discussed with FIG. 5.

Continuing to FIG. 4, the pose model 260 accepts two monocular images (i.e., a training pair) from the training data of the same scene as an electronic input and processes the monocular images (It, Is) 410/420 of the images 230 to produce estimates of camera ego-motion in the form of a set of 6 degree-of-freedom (DOF) transformations between the two images. The pose model 260 itself is, for example, a convolutional neural network (CNN) or another learning model that is differentiable and performs dimensional reduction of the input images to produce the transformation 430. In one arrangement, the pose model 260 includes 7 stride-2 convolutions, a 1×1 convolution with 6*(N−1) output channels corresponding to 3 Euler angles and a 3-D translation for one of the images (source image $I_s$), and global average pooling to aggregate predictions at all spatial locations. The transformation 430 is, in one embodiment, a 6 DOF rigid-body transformation belonging to the special Euclidean group SE (3) that represents the change in pose between the pair of images provided as inputs to the model 260. In any case, the pose model 260 performs a dimensional reduction of the monocular images to derive the transformation 430 therefrom.

With reference to FIG. 5, the motion model 270 accepts two of the depth maps 240, which the depth model 250 generates along with the original images 230 from which the depth maps 240 are derived. Of course, as previously explained, in an alternative arrangement, the motion model 270 accepts encoded features from the images 230 instead of the images 230 themselves. In any case, the motion model 270 generally functions to perform scene flow, which is the task of estimating pixelwise 3D motion between a pair of video frames. The motion model 270 itself is an end-to-end differentiable architecture, which estimates pixelwise 3D motion from monocular depth and RGB images. The motion model 270 functions to generate rigid-motion embeddings 500 that are per-pixel vectors. In general, the motion model 270 functions to infer the embeddings 500 by applying a differentiable layer that iteratively updates a dense field of per-pixel SE3 motion using unrolled Gauss-Newton iterations such that the per-pixel SE3 motion is geometrically consistent with the current estimates of rigid-motion embeddings and pixel correspondence. The motion model 270 extracts features from the input images 230 and corresponding depth maps 240 to build a 4D correlation volume through computation of a visual similarity between all pairs of pixels. The motion model 270 maintains and updates a dense field of pixelwise SE3 motion. That is, during each iteration, the motion model 270 uses current estimates of motion to index from the correlation volume (i.e., comparison of clusters of points according to motion). A recurrent GRU-based update operator takes the correlation features and produces an estimate of pixel correspondence, which is then used by Dense-SE3 to generate updates to the SE3 motion field.

For example, as shown in FIG. 5, the motion model 270 uses features extracted from the inputs to construct the 4D correlation volume. The SE3 motion field "T" is initialized to be the identity at each pixel. During an iteration, the model 270 uses the current SE3 motion estimate to index from the correlation volume, using the correlation features and hidden state to produce estimates of pixel correspondence and rigid-motion embeddings 500. The pixel correspondence and the rigid-motion embeddings 500 feed into Dense-SE3, which is a differentiable optimization layer that performs a least-squares using geometric constraints to produce an update to the SE3 field. The motion model 270 then projects the SE3 field onto the image to recover the optical flow (i.e., the motion).

As an additional note, while the depth model 250, the pose model 260, and the motion model 270 are shown as discrete units separate from the network module 220, the depth model 250, the pose model 260, and the motion model 270 are, in one or more embodiments, generally integrated with the network module 220. That is, the network module 220 functions to execute various processes of the models 250/260/270 and use various data structures of the models 250/260/270 in support of such execution. Accordingly, in one embodiment, the network module 220 includes instructions that function to control the processor 110 to generate the depth map 240 using the depth model 250, generate the transformation 430 using the pose model 260, and generate the rigid-motion embeddings 500 using the motion model 270 as disclosed.

Figure 6:
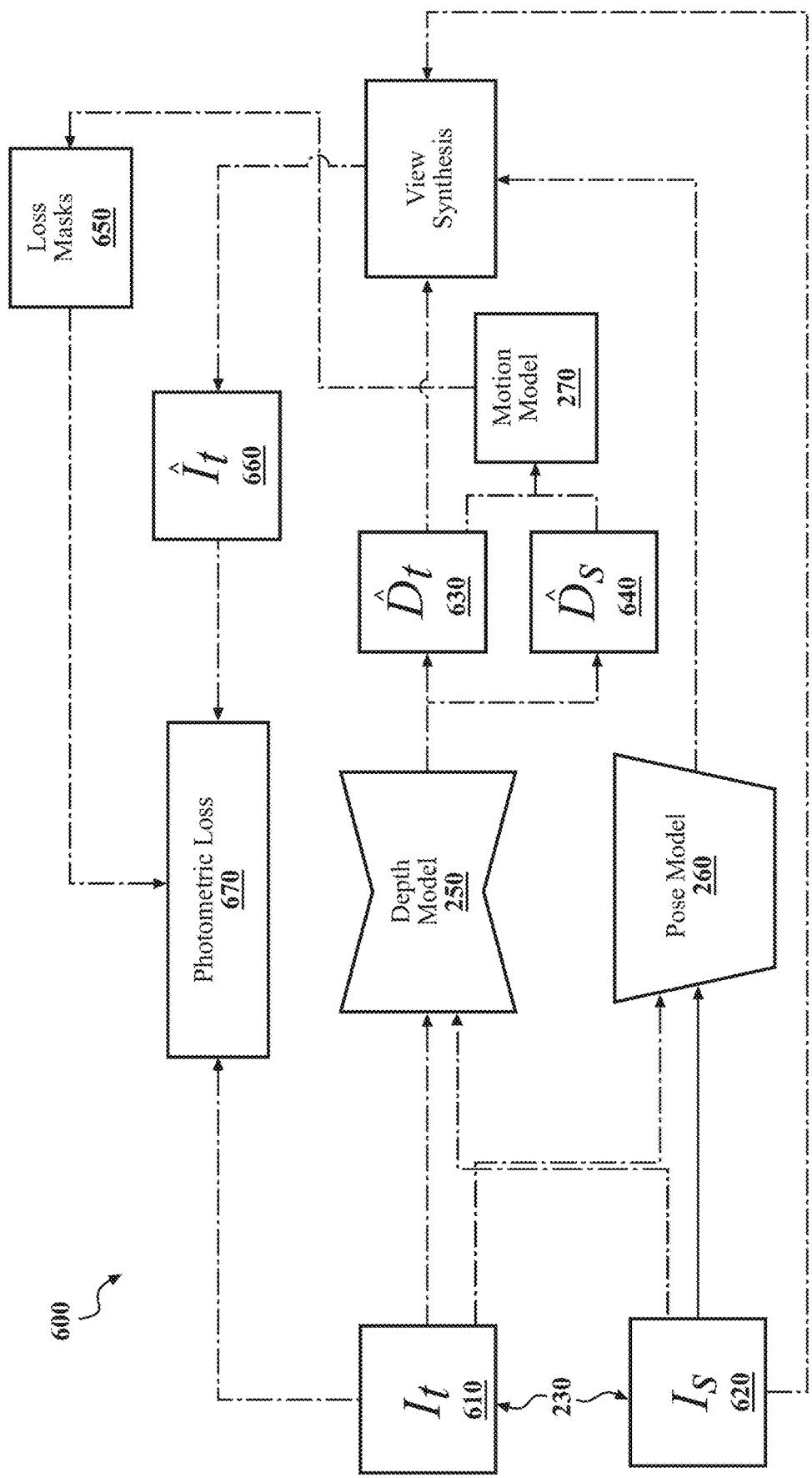
FIG. 6 illustrates one embodiment of a training architecture that includes derives photometric loss masks for dynamic objects.

As a further explanation of the training architecture formed in relation to the depth model 250, the pose model 260, and the motion model 270, consider FIG. 6 in relation to components previously described in relation to FIG. 2. FIG. 6 illustrates one embodiment of a training architecture 600 that denotes various relationships between the depth model 250, the pose model 260, the motion model 270, and inputs/outputs thereof. As shown in FIG. 6, the images 230 include a first image ($I_t$) 610 and a second image ($I_s$) 620 of a training pair. As an initial note about training using the illustrated architecture 600, the network module 220 generally includes instructions that function to control the processor 110 to execute various actions associated with training the depth model 250, the pose model 260, and the motion model 270. For example, the network module 220, in one embodiment, controls the training and various functions associated therewith (i.e., view synthesis, loss masks 650, etc.), as shown.

In general, the training includes a self-supervised training process that involves synthesizing an additional image 660 using the transformation 430 and one of the depth maps 630 associated with a source image in order to generate a self-supervised loss in the form of photometric loss 670. In any case, the network module 220 generally includes instructions that function to control the processor 110 to execute various actions associated with the models 250/260/270. For example, in one embodiment, the network module 220 functions to process the first image 610 of a pair of training images from the training data according to the depth model 250 to produce the depth map 630 for training. Additionally, the network module 220 further processes the second image 620 to produce depth map 640, which are then provided as inputs to the motion model 270. The network module 220, in further embodiments, also uses the depth model 250 to generate the depth map 240 for additional purposes, once trained, such as resolving aspects of an environment for hazard avoidance, path planning, and so on.

In any case, the network module 220 also functions to execute the pose model 260 to produce the transformation 430 (not illustrated), which functions as a basis for synthesizing the image 660 from which the network module 220 generates the photometric loss 670 as will be explained further subsequently. In order to generate the photometric loss 670, the network module 220 first executes the motion model 270, which generates the rigid-motion embeddings 500 that then provide for deriving the photometric loss masks 650. Accordingly, as noted previously, the motion model 270 uses input in the form of the depth maps 630/640 and also the images 610/620 or at least encoded features of the images 610/620 from a shared backbone with the depth model 250. The network module 220 then executes the motion model 270 to derive the motion from the points of the depth maps and associate clusters of the points according to shared motion. That is, the motion model 270 identifies motion of the points within the depth maps/images and through a correlation/comparison over the known motion estimates with new motion estimates is able to correlate clusters of points within similar/the same motion and depth to dynamic objects present in the scene. The associated points define rigid-motion embeddings (e.g., motion of rigid objects), thereby identifying dynamic objects depicted within the images.

In any case, once the network module 220 executes the models 250/260/270 over the images 610/620 to produce the depth maps 630/640, the rigid-motion embeddings 500, and the transformation 430, the network module 220 generates the synthesized image 660. In one embodiment, the synthesized image 660 is, for example, a synthesized version of the second image 620 according to the depth map 630 and the transformation 430. That is, the process of self-supervised training of the depth model 250 in the structure from motion (SfM) context involves synthesizing a different image from the first image 610 that is of the same scene from a different camera pose. The network module 220 generates the synthesized image 660 through a warping procedure or using a machine learning algorithm such as a generative neural network (e.g., encoder/decoder architecture, a generative adversarial network (GAN), an autoencoder, etc.), a convolutional neural network (CNN), or another suitable architecture.

The network module 220 further uses the dynamic objects identified from the rigid-motion embeddings 500 to generate the photometric loss masks 650. In one approach, the network module 220 correlates the dynamic objects with respective pixels and generates the masks 650 to cover the pixels corresponding to the dynamic objects. Accordingly, the network module 220 generates the masks 650 to cover pixels of the dynamic objects.

From this synthesized image 660, the network module 220 can generate the photometric loss 670 and a pose loss (not illustrated). Thus, the network module 220 formulates the generation of the depth map 240 as a photometric error minimization across the images 610/620 (e.g., $I_{t-1}$ and $I_{t+1}$). The network module 220 can then compare the synthesized image 660 and the original image 610 to determine the photometric loss 670. In generating the photometric loss 670, the network module 220 uses the loss masks 650 to occlude (i.e., block out) the dynamic objects from the calculation of the photometric loss 670, thereby avoiding inaccuracies in the loss determination that may result from the presence of dynamic objects within the training images. This loss characterizes an accuracy of the depth model 250 in producing the depth maps 240. Thus, the network module 220 can then use the calculated loss to adjust the depth model 250.

As further explanation consider the self-supervised loss context for structure from motion (SfM), which involves the network module 220 being generally configured with a goal of (i) a monocular depth model $f_D$: I→D (e.g., depth model 250), that predicts the scale-ambiguous depth $\hat{D}=f_D(I(p))$ for every pixel p in the target image $I_t$; and (ii) a monocular ego-motion estimator $f_x:(I_t,I_s)$ (e.g., pose model 260), that predicts the set of 6-DoF rigid-body transformations for all s∈S given by $$x_{t \to s} = \begin{pmatrix} R & t \\ 0 & 1 \end{pmatrix} \in SE, \tag{3}$$

between the target image $I_t$ and the set of source images $I_s \in I_s$ considered as part of the temporal context. As a point of implementation, in one or more embodiments, the network module 220 uses frames $I_{t-1}$ and $I_{t+1}$ as source images, although a larger context, as previously noted, is possible. Additionally, the network module 220 uses the depth data from the training data to (i) collapse the scale ambiguity inherent to a single camera configuration into a metrically accurate version of the depth model 250, and (ii) improves the depth model 250 and the pose model 260 by leveraging cues from the depth data that are not appearance-based.

The network module 220, in at least one arrangement, implements the training objective for the depth model 250 according to various components. The components include a self-supervised term (e.g., photometric loss 670) that operates on appearance matching $\mathcal{L}_p$ between the target image $I_t$ and the synthesized image $I_{s \to t}$ (also annotated as $\hat{I}_t$) from the context set $S=\{I_s\}_{s=1}^S$, with masking $M_p$ and depth smoothness $\mathcal{L}_{smooth}$.

$$\mathcal{L}(I_t, \hat{I}_t) = \mathcal{L}_p \odot \mathcal{M}_p + \lambda_1 \mathcal{M}_{smooth} \tag{1}$$

$M_p$ is a binary mask that avoids computing the photometric loss on the pixels that do not have a valid mapping (e.g., pixels from the separate images that do not project onto the target image given the estimated depth). Within the present approach, $M_p$ also includes the loss masks 650 in order to avoid computing the photometric loss on pixels that are associated with dynamic objects.

$\lambda_1$, $\lambda_2$ represent weights for adjusting the loss terms in eq (1). $\mathcal{L}_p$ represents appearance matching loss and is implemented according to, in one embodiment, a pixel-level similarity between the target image $I_t$ and the synthesized image $\hat{I}_t$ using a structural similarity (SSIM) term combined with an L1 pixel-wise loss term inducing an overall photometric loss as shown in equation (2).

$$\mathcal{L}_p(I_t, \hat{I}_t) = \alpha \frac{1 - SSIM(I_t, \hat{I}_t)}{2} + (1-\alpha)\|(I_t, \hat{I}_t)\| \tag{2}$$

While multi-view projective geometry provides strong cues for self-supervision, errors due to parallax and out-of-bounds objects have an undesirable effect incurred on the photometric loss that can include added noise to the training. Accordingly, in one or more approaches, the network module 220 can mitigate these effects by calculating the minimum photometric loss per pixel for the source image according to (3).

$$\mathcal{L}_p(I_t, S) = \min_{s \in S} \mathcal{L}_p(I_t, I_{s \to t}) \tag{3}$$

The intuition involves the same pixel not occluding or being out-of-bounds in all context images, and that the association with minimal photometric loss should be the correct association. Additionally, as shown below, the network module 220 masks-out static pixels by removing pixels that have a warped photometric loss higher than a corresponding unwarped photometric loss, which the network module 220 calculates using the original source image (e.g., 620) without synthesizing the target. The mask ($M_p$) removes pixels that have appearance loss that does not change between frames, which includes static scenes and dynamic objects moving at a similar speed as the camera. Moreover, as presently defined, the mask ($M_p$) also masks out dynamic objects with relative speeds that are not similar to the camera per the rigid-motion embeddings and the loss masks 650 (addition not shown).

$$M_p = \left(\min_{s \in S} \mathcal{L}_p(I_t, I_s) > \min_{s \in S} \mathcal{L}_p(I_t, I_{s \to t})\right) \tag{4}$$

$\mathcal{L}_s$ represents depth smoothness loss and is implemented to regularize the depth in textureless low-image gradient regions, as shown in equation (5). The smoothness loss is an edge-aware term that is weighted for separate pyramid levels starting from 1 and decaying by a factor of two for the separate scales.

$$\mathcal{L}_s(\hat{D}_t) = |\delta_x \hat{D}_t| e^{-|\delta_x I_t|} + |\delta_y \hat{D}_t| e^{-|\delta_y I_t|} \quad (5)$$

Thus, the network module 220, in one approach, calculates the appearance-based loss according to the above to include the photometric loss, the mask, and the depth smoothness terms for the self-supervised training. Through this training, the depth model 250 develops a learned prior of the monocular images as embodied by the internal parameters of the model 250 from the training on the image pairs. In general, the model 250 develops the learned understanding about how depth relates to various aspects of an image according to, for example, size, perspective, and so on.

It should be appreciated that the network module 220 trains the depth model 250 and the pose model 260 together in an iterative manner over the training data that includes a plurality of monocular images from video. Through the process of training the model 250, the network module 220 adjusts various hyper-parameters in the model 250 to fine-tune the functional blocks included therein. Through this training process, the model 250 develops a learned prior of the monocular images as embodied by the internal parameters. In general, the model 250 develops the learned understanding about how depth relates to various aspects of an image according to, for example, size, perspective, and so on. Consequently, the network module 220 can provide the resulting trained depth model 250 in the depth system 170 to estimate depths from monocular images that do not include an explicit modality identifying the depths. In further aspects, the network module 220 may provide the depth model 250 to other systems that are remote from the depth system 170 once trained to perform similar tasks. In this way, the depth system 170 functions to improve the accuracy of the depth model 250 while avoiding difficulties with dynamic objects that may be present within the training data and further provides the motion model 270 as a mechanism for generating scene flow and identifying dynamic rigid objects.

Figure 7:
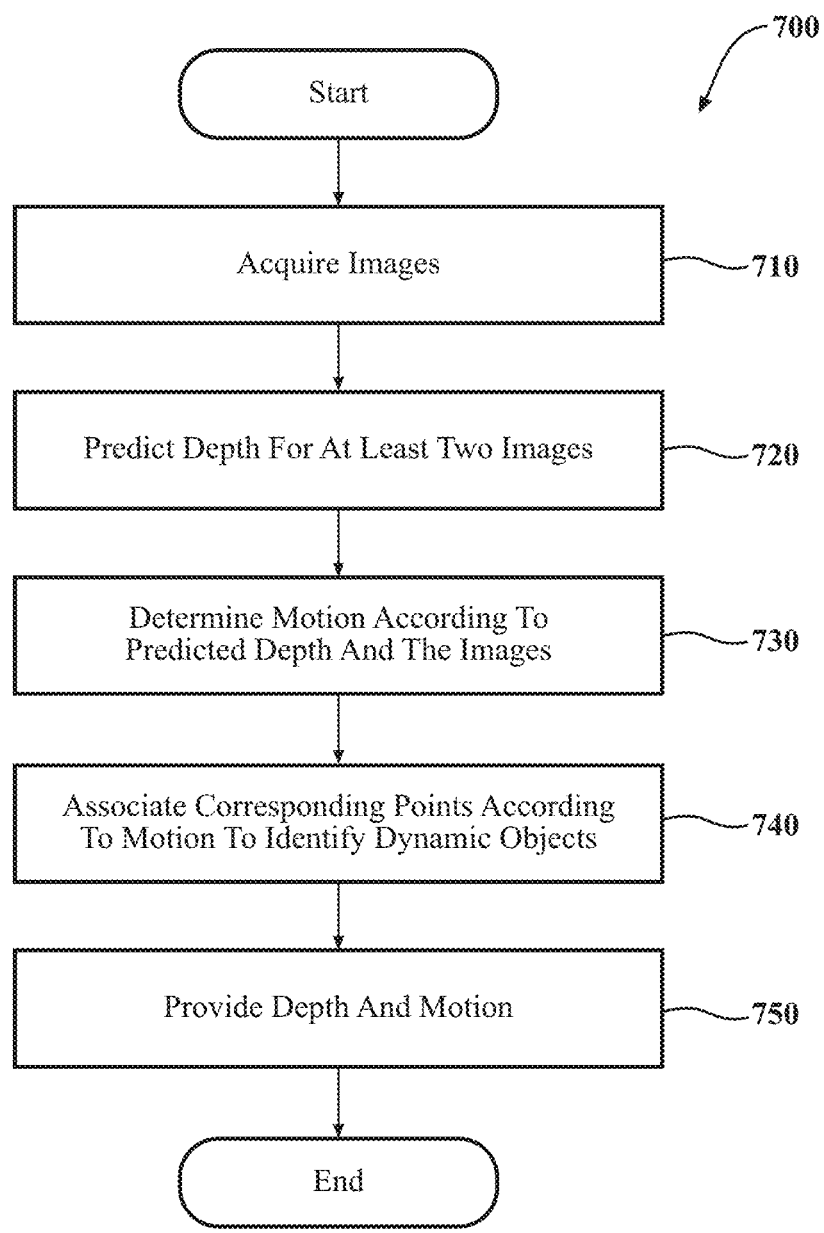
FIG. 7 is a flowchart showing one approach to inferring depth, pose, and motion from monocular images.

Additional aspects of generating depth estimates and identifying dynamic objects from monocular images will be discussed in relation to FIG. 7. FIG. 7 illustrates a flowchart of a method 700 that is associated with inferring depth and dynamic objects from monocular images. Method 700 will be discussed from the perspective of the depth system 170. While method 700 is discussed in combination with the depth system 170, it should be appreciated that the method 700 is not limited to being implemented within the depth system 170 but is instead one example of a system that may implement the method 700.

At 710, the network module 220 receives at least two of the images 230 including a pair of monocular training images. In one embodiment, the network module 220 acquires the images 230 locally from co-located systems with the depth system 170 (e.g., the camera 126) in an active manner, while in further embodiments, the network module 220 may acquire the images through a communication link with a remote system or from a repository of such information as included in the data store 225. Thus, while the depth system 170 can be implemented within a particular device that is, for example, actively navigating an environment, the depth system 170 may also function as a cloud-based computing service to analyze monocular images for depth/object information, and thus may receive the images 230 from separate sources.

At 720, the network module 220 causes the network module 220 to execute the depth model 250 on two of the images 230. In one embodiment, the network module 220 executes the depth model 250 to process the two images and generate the depth maps 240 in order to generate information for input to the motion model 270 since the motion model 270 uses two images with associated depth information to provide the rigid-motion embeddings. In general, the depth model 250 itself can provide a depth map as output from a single monocular image. Here, the depth model 250 iterates over two separate images in order to provide depth maps corresponding with the images so that at least two image/depth pairs are available as inputs to the motion model 270.

At 730, the network module 220 determines the motion of points within the depth maps. In one arrangement, the network module 220 processes the image/depth pairs using the motion model 270 to generate estimates of the motion within a depicted scene. As noted previously, the motion model 270 determines the motion of the points by deriving rigid-motion embeddings per-pixel from the images/maps according to estimates of Special Euclidean group three (SE3) motion. Thus, the motion model 270 analyzes the provided inputs in order to generate estimates of the motion depicted within the images.

At 740, the network module 220 associates the points to identify dynamic objects. In general, the motion model 270 functions to correlate the estimated motion for a first cluster of the points with a second cluster of the points. When the clusters between identified sets of points have corresponding motion, the motion model 270 indicates the correspondence as common movement associated with a dynamic object. It should be appreciated that the shared movement and depth of points in the images is indicative of corresponding rigid objects that are presently in motion (i.e., dynamic). Thus, the motion model 270 can indicate the presence of multiple different objects for each iteration.

At 750, the network module 220 provides the depth maps 240 and indications of the dynamic object as an electronic output. It should be appreciated that the network module 220 can provide the electronic output to additional systems/modules in the vehicle 100 in order to control the operation of the modules and/or the vehicle 100 overall. In still further aspects, the network module 220 communicates the electronic outputs to a remote system (e.g., cloud-based system) as, for example, a mechanism for mapping the surrounding environment or for other purposes (e.g., traffic reporting, etc.). As one example, the network module 220, in one approach, uses the depth map 240 to map locations of obstacles in the surrounding environment and plan a trajectory that safely navigates the obstacles. Thus, the network module 220 may, in one embodiment, control the vehicle 100 to navigate through the surrounding environment.

In further aspects, the network module 220 conveys the electronic outputs to further internal systems/components of the vehicle 100 such as the autonomous driving module 160. By way of example, in one arrangement, the network module 220 generates the depth map 240 and the indicators about the dynamic objects using the depth model 250/motion model 270 and conveys the electronic outputs to the autonomous driving module 160. In this way, the depth system 170 informs the autonomous driving module 160 of the depth estimates and the dynamic objects to improve situational awareness and planning of the module 160. It should be appreciated that the autonomous driving module 160 is indicated as one example, and, in further arrangements, the network module 220 may provide the depth map 240 to the module 160 and/or other components in parallel or as a separate conveyance.

Figure 8:
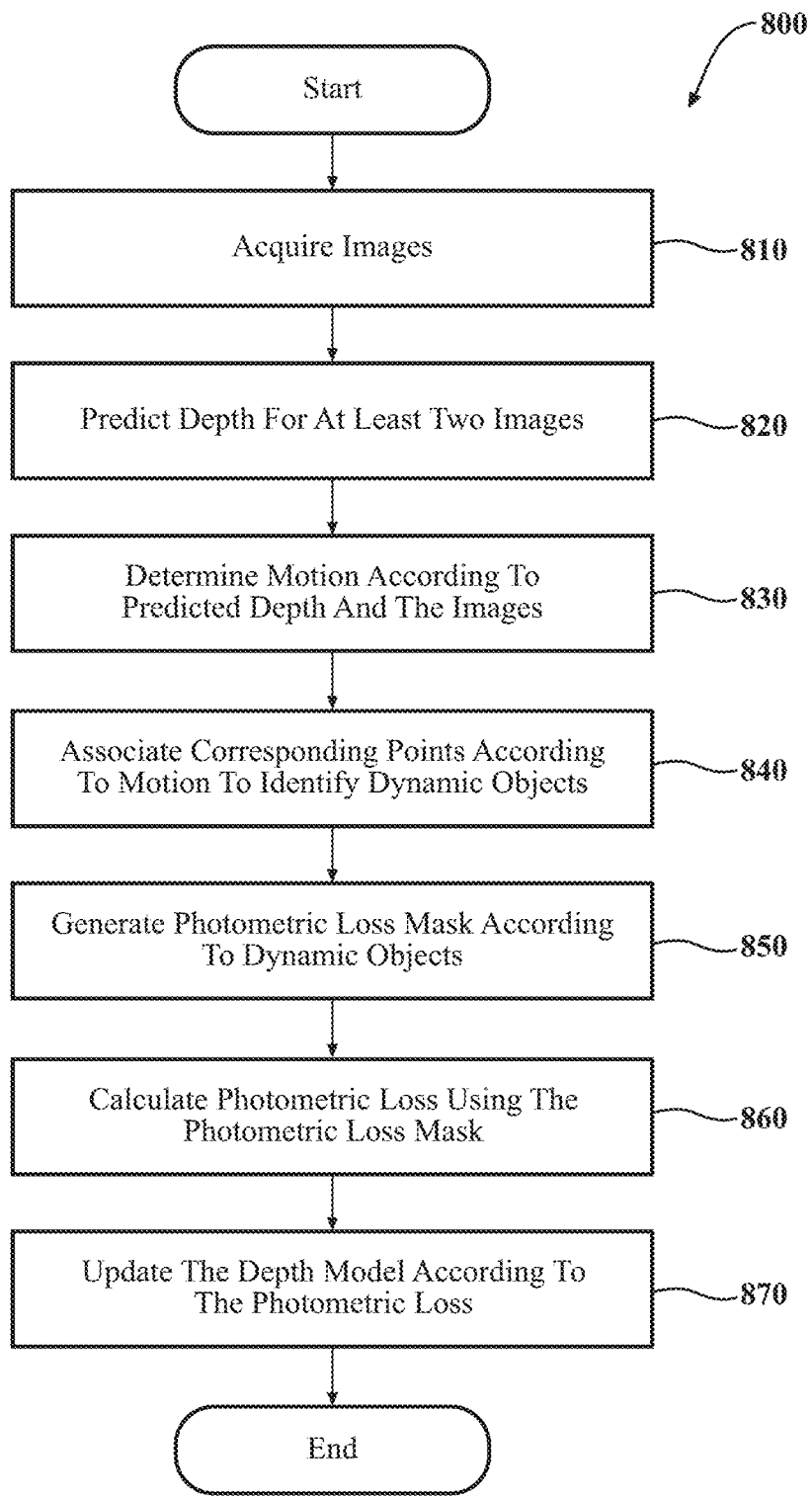
FIG. 8 is a flowchart illustrating one embodiment of a method for training a depth model.

FIG. 8 illustrates a flowchart of a method 800 that is associated with training a depth model using masks for dynamic objects. Method 800 will be discussed from the perspective of the depth system 170. While method 800 is discussed in combination with the depth system 170, it should be appreciated that the method 800 is not limited to being implemented within the depth system 170 but is instead one example of a system that may implement the method 800. As an additional note, aspects of method 800 overlap with some aspects of method 700. Thus, for blocks that correspond to overlapping functions, the description will remain brief and refer to the prior block of FIG. 7.

At 810, the network module 220 acquires the images 230. As previously outlined, the images are derived from a monocular video and for purposes of training are grouped into pairs such that the pairs of images are captured within a defined time of one another.

At 820, similar to the description at block 720, the network module 220 generates depth maps for two of the images that form a training pair. Accordingly, the network module 220 executes the depth model 250 to not only generate a single depth map for training the depth model 250, but also to generate an additional depth map to form pairs of images/depth maps for use by the motion model 270 in producing motion estimates.

Additionally, at 820, the network module 220 executes the pose model 260 to process the first image and a second image of the training pair to generate the transformation 430. Although the pose model 260 may be used in various circumstances for generating transformations, the depth system 170 generally uses the pose model 260 for the limited application of training the depth model 250. Thus, when implemented as part of the depth system 170, the pose model 260 may reside in an idle state when the system 170 is not training the depth model 250. The pose model 260 functions to facilitate the self-supervised structure from motion (SfM) training regime by providing the transformation 430 from which the network module 220 may assess the performance of the depth model 250. Of course, as an additional aspect of using the pose model 260 to generate the transformation 430, the network module 220 also trains the pose model 260 and does so, in one embodiment, in combination with the depth model 250. Once the network module 220 has generated the depth maps and the transformation, the network module 220 can then derive the synthetic image from which the loss calculation is generated.

At 830, similar to as described at block 730, the network module 220 determines motion of points within the depth maps/images using the motion model 270.

At 840, similar to as described at block 740, the network module 220 associates the points between the depth maps to identify dynamic objects. In general, the network module 220 applies the motion model 270, which functions to correlate clusters of the points between estimations of motion. That is, the motion model 270 identifies areas of similar motion and depth according to SE3 motion vectors. The network module 220 then uses the rigid-motion embeddings that correlate the similar areas of motion to identify the dynamic objects within the images.

At 850, the network module 220 generates photometric loss masks associated with the dynamic objects. In one configuration, the network module 220 generates the masks according to a correspondence between individual dynamic objects and pixels within the synthesized image that corresponds to the dynamic objects. That is, because the masks are derived in order to prevent consideration of the dynamic objects in the loss calculation, the network module 220 generates the mask to cover each pixel within the synthetic image that represents the dynamic objects. In this way, the network module 220 masks the synthetic image.

At 860, the network module 220 computes the self-supervised loss (e.g., photometric loss, depth smoothness loss, etc.). In one embodiment, the network module 220 also computes a pose loss. In any case, in one arrangement, the network module 220 initially calculates the self-supervised loss according to a comparison between the synthetic image and the target image (i.e., the first image of the pair) according to the photometric loss function, which may include an appearance loss, a regularization/depth smoothness loss, and/or other components that are appearance-based. In particular, the network module 220 applies the photometric loss mask derived from the rigid-motion embeddings in order to mask out the dynamic objects present in the image.

Thus, the network module 220 uses this appearance-based loss to account for pixel-level similarities and irregularities between the synthesized image derived from depth predictions of the depth model 250 and a target image that is the original input into the depth model 250. In one approach, the network module 220 synthesizes a target image $\hat{I}_t$ from the depth map 240 and the transformation 430. This synthesized target image $\hat{I}_t$ generally corresponds to the first training image $I_t$ as opposed to the second training image $I_s$ of the pair $I_t$, $I_s$ that is provided into the depth model 250 and to which the depth map 240 $\hat{D}_t$ corresponds. Thus, the network module 220 generates the synthetic target image $\hat{I}_t$ as a regenerated view of the same scene depicted by the depth map 240 and the first training image $I_t$. In one embodiment, the network module 220 generates the synthetic image according to a warping operation that functions to adapt a viewpoint of the camera in order to recover the original first image as the synthesized image. In various approaches, the network module 220 may implement different algorithms to perform the warping, which may include a convolutional neural network (CNN) or other machine learning architecture. Whichever approach is undertaken, the synthetic image serves as a point of comparison in order to identify the accuracy of the depth model 250 in producing the depth map $\hat{D}_t$ and the inclusion of the photometric loss masks facilitates avoiding irregularities from motion of the dynamic objects.

At 870, the network module 220 trains the depth pipeline. In one approach, the network module 220 trains the depth model 250 using the photometric loss. In general, the network module 220 updates the depth model 250 according to the loss values as determined by the network module 220. In one embodiment, the network module 220 updates the depth model 250 using the loss values to adapt weights in the model 250. Therefore, the disclosed training approach implemented by the depth system 170 improves the understanding of the depth model 250 while using the self-supervised loss without any additional supervision for the depth model 250, the pose model 260, or the motion model 270. In this way, the depth system 170 improves the depth model 250 to produce improved depth estimates that translate into improved situational awareness of the implementing device (e.g., the vehicle 100), and improved abilities to navigate and perform other functions therefrom.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system, comprising:
   one or more processors;
   a memory communicably coupled to the one or more processors and storing instructions that, when executed by the one or more processors, cause the one or more processors to:
   generate depth maps from images of an environment;
   determine motion of points based on the depth maps;
   associate the points between the depth maps to identify an object according to a correlation of the motion indicating common movement for a first cluster of the points with a second cluster of the points; and
   train a depth pipeline using a photometric loss that is derived according to the depth maps and a mask that removes the object from a determination of the photometric loss, the mask being generated according to an association of the first cluster and the second cluster from the depth maps that are correlated based, at least in part, on the motion.

2. The depth system of claim 1, wherein the instructions include instructions to determine the motion of the points including instructions to derive rigid-motion embeddings per-pixel from the images and the depth maps using estimates of Special Euclidean group three (SE3) motion.

3. The depth system of claim 2, wherein the instructions include instructions to determine the rigid-motion embeddings including instructions to apply a motion model that learns the rigid-motion embeddings via ego-motion of a camera that generates the images.

4. The depth system of claim 2, wherein the instructions include instructions to associate the points between the depth maps including instructions to determine when the first cluster and the second cluster correlate to an extent that is indicative of the common movement associated with the object, and
   wherein a motion model associates the points according to shared depth and shared motion.

5. The depth system of claim 1, wherein the instructions further include instructions to:
   generate the mask associated with the object according to an association of the first cluster and the second cluster.

6. The depth system of claim 1, wherein the instructions to determine the motion include instructions to:
   build a 4D correlation volume using the depth maps and encoded features of the images.

7. The depth system of claim 1, wherein the instructions include instructions to train including instructions to train the depth pipeline according to a self-supervised monocular structure-from-motion (sfm) process that uses a monocular video of the environment collected while a camera is in motion through the environment to generate the images for inputs to the depth pipeline.

8. The depth system of claim 1, wherein a depth pipeline that provides the depth maps and the objects includes a depth model that predicts depths within a scene depicted by the images, a pose model that predicts ego-motion of a camera that generated the images, and a motion model that predicts rigid-motion embeddings indicating motion associated with pixels of the images.

9. A non-transitory computer-readable medium including instructions that, when executed by one or more processors, cause the one or more processors to:
   generate depth maps from images of an environment;
   determine motion of points based on the depth maps;
   associate the points between the depth maps to identify an object according to a correlation of the motion indicating common movement for a first cluster of the points with a second cluster of the points; and
   train a depth pipeline using a photometric loss that is derived according to the depth maps and a mask that removes the object from a determination of the photometric loss, the mask being generated according to an association of the first cluster and the second cluster from the depth maps that are correlated based, at least in part, on the motion.

10. The non-transitory computer-readable medium of claim 9, wherein the instructions include instructions to determine the motion of the points including instructions to derive rigid-motion embeddings per-pixel from the images and the depth maps using estimates of Special Euclidean group three (SE3) motion.

11. The non-transitory computer-readable medium of claim 9, wherein the instructions further include instructions to:
generate the mask associated with the object according to an association of the first cluster and the second cluster.

12. The non-transitory computer-readable medium of claim 11, wherein the instructions to determine the motion include instructions to:
build a 4D correlation volume using the depth maps and encoded features of the images.

13. A method, comprising:
generating depth maps from images of an environment;
determining motion of points based on the depth maps;
associating the points between the depth maps to identify an object according to a correlation of the motion indicating common movement for a first cluster of the points with a second cluster of the points; and
training a depth pipeline using a photometric loss that is derived according to the depth maps and a mask that removes the object from a determination of the photometric loss, the mask being generated according to an association of the first cluster and the second cluster from the depth maps that are correlated based, at least in part, on the motion.

14. The method of claim 13, wherein determining the motion of the points includes deriving rigid-motion embeddings per-pixel from the images and the depth maps using estimates of Special Euclidean group three (SE3) motion.

15. The method of claim 14, wherein determining the rigid-motion embeddings includes applying a motion model that learns the rigid-motion embeddings via ego-motion of a camera that generates the images.

16. The method of claim 14, wherein associating the points between the depth maps includes determining when the first cluster and the second cluster correlate to an extent that is indicative of the common movement associated with the object, and
wherein a motion model associates the points according to shared depth and shared motion.

17. The method of claim 13, further comprising:
generating the mask associated with the object according to an association of the first cluster and the second cluster.

18. The method of claim 13,
wherein determining the motion includes building a 4D correlation volume using the depth maps and encoded features of the images.

19. The method of claim 18, wherein training includes training the depth pipeline according to a self-supervised monocular structure-from-motion (sfm) process that uses a monocular video of the environment collected while a camera is in motion through the environment to generate the images for inputs to the depth pipeline.

20. The method of claim 13, wherein a depth pipeline includes a depth model that predicts depths within a scene depicted by the images, a pose model that predicts ego-motion of a camera that generated the images, and a motion model that predicts rigid-motion embeddings indicating motion associated with pixels of the images.

\* \* \* \* \*